(12) United States Patent
Jeong et al.

(10) Patent No.: US 10,469,907 B2
(45) Date of Patent: Nov. 5, 2019

(54) SIGNAL PROCESSING METHOD FOR DETERMINING AUDIENCE RATING OF MEDIA, AND ADDITIONAL INFORMATION INSERTING APPARATUS, MEDIA REPRODUCING APPARATUS AND AUDIENCE RATING DETERMINING APPARATUS FOR PERFORMING THE SAME METHOD

(71) Applicant: Electronics and Telecommunications Research Institute, Daejeon (KR)

(72) Inventors: Young Ho Jeong, Daejeon (KR); Seung Kwon Beack, Daejeon (KR); Tae Jin Lee, Daejeon (KR); Hui Yong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 16/025,217

(22) Filed: Jul. 2, 2018

(65) Prior Publication Data

US 2019/0306577 A1 Oct. 3, 2019

(30) Foreign Application Priority Data

Apr. 2, 2018 (KR) .......................... 10-2018-0038053

(51) Int. Cl.
| | | |
|---|---|---|
| *H04N 21/466* | (2011.01) | |
| *G10L 19/018* | (2013.01) | |
| *H04N 21/435* | (2011.01) | |
| *H04N 21/442* | (2011.01) | |

(52) U.S. Cl.
CPC ....... *H04N 21/4667* (2013.01); *G10L 19/018* (2013.01); *H04N 21/435* (2013.01); *H04N 21/44213* (2013.01)

(58) Field of Classification Search
CPC ......... H04N 21/4667; H04N 21/44213; H04N 21/435; G10L 19/018
See application file for complete search history.

(56) References Cited

U.S. PATENT DOCUMENTS

| | | | | |
|---|---|---|---|---|
| 9,788,777 B1* | 10/2017 | Knight | .................. | A61B 5/165 |
| 2007/0055500 A1* | 3/2007 | Bilobrov | ........... | G06F 17/30743 704/217 |
| 2010/0011389 A1 | 1/2010 | Lee et al. | | |
| 2010/0169652 A1* | 7/2010 | Butler | .................. | G06T 1/0021 713/176 |

(Continued)

FOREIGN PATENT DOCUMENTS

| | | |
|---|---|---|
| KR | 10-1369475 B1 | 3/2014 |
| KR | 10-2017-0077550 A | 7/2017 |

*Primary Examiner* — Benjamin R Bruckart
*Assistant Examiner* — Aklil M Tesfaye
(74) *Attorney, Agent, or Firm* — NSIP Law

(57) ABSTRACT

Provided are a signal processing method for determining an audience rating of media, and an additional information inserting apparatus, a media reproducing apparatus and an audience rating determining apparatus for performing the same method. In detail, the signal processing method for determining an audience rating of media is a method that may determine an audience rating of media with respect to a whole section of an audio signal by inserting additional information into a silence section through a noise signal.

19 Claims, 9 Drawing Sheets

(56) References Cited

U.S. PATENT DOCUMENTS

| | | | |
|---|---|---|---|
| 2012/0150890 A1* | 6/2012 | Jeong | G06F 16/7834 |
| | | | 707/758 |
| 2014/0108441 A1* | 4/2014 | Samari | G06F 17/30551 |
| | | | 707/758 |
| 2014/0277641 A1* | 9/2014 | Bilobrov | G10L 25/51 |
| | | | 700/94 |
| 2014/0282671 A1* | 9/2014 | McMillan | H04N 21/8352 |
| | | | 725/19 |
| 2015/0350698 A1* | 12/2015 | Ramaswamy | H04N 21/25891 |
| | | | 725/14 |
| 2016/0148334 A1* | 5/2016 | Petrovic | G10L 19/018 |
| | | | 382/100 |
| 2017/0025128 A1* | 1/2017 | Blesser | G10L 19/0204 |
| 2017/0148126 A1* | 5/2017 | Srinivasan | G06T 1/0028 |
| 2017/0150222 A1 | 5/2017 | Kim et al. | |
| 2018/0098122 A1* | 4/2018 | Cho | H04N 21/44204 |
| 2018/0146245 A1* | 5/2018 | Petrovic | G06F 21/16 |
| 2019/0043091 A1* | 2/2019 | Tapse | G06Q 30/0271 |
| 2019/0115034 A1* | 4/2019 | Frett | G06T 1/0085 |

\* cited by examiner

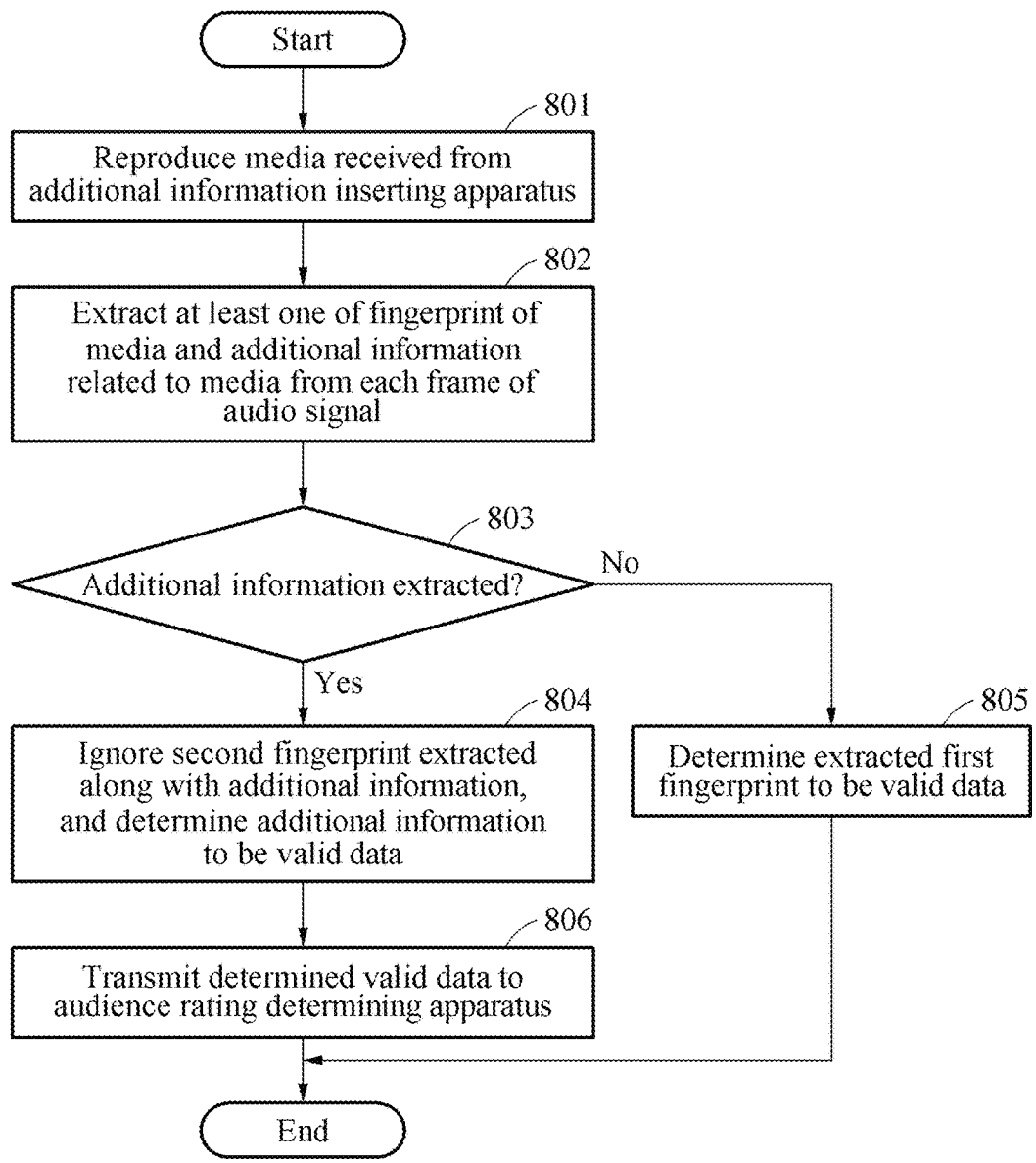

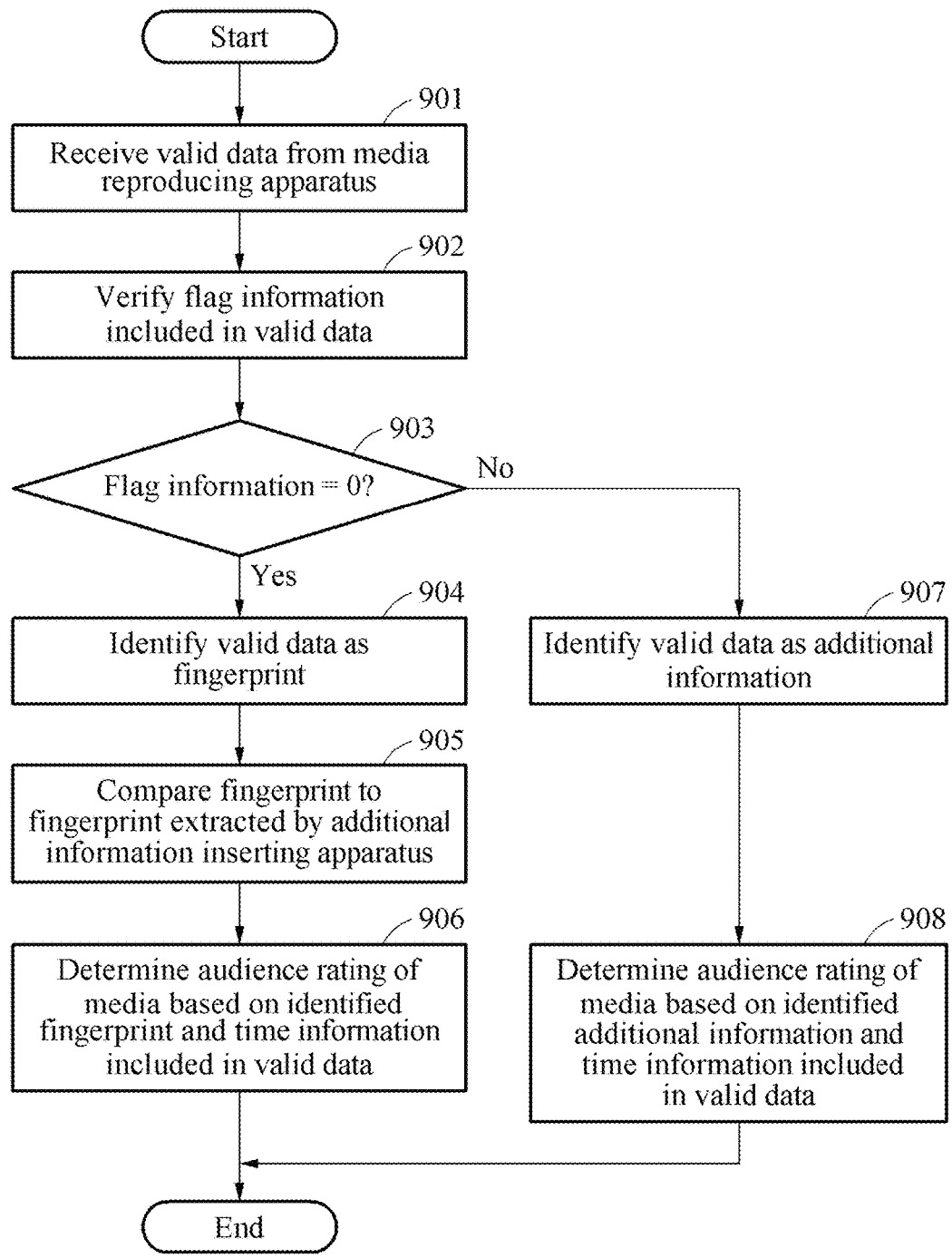

SIGNAL PROCESSING METHOD FOR DETERMINING AUDIENCE RATING OF MEDIA, AND ADDITIONAL INFORMATION INSERTING APPARATUS, MEDIA REPRODUCING APPARATUS AND AUDIENCE RATING DETERMINING APPARATUS FOR PERFORMING THE SAME METHOD

CROSS-REFERENCE TO RELATED APPLICATION(S)

This application claims the priority benefit of Korean Patent Application No. 10-2018-0038053 filed on Apr. 2, 2018, in the Korean Intellectual Property Office, the disclosure of which is incorporated herein by reference for all purposes.

BACKGROUND

1. Field

One or more example embodiments relate to a signal processing method for determining an audience rating of media, and an additional information inserting apparatus, a media reproducing apparatus and an audience rating determining apparatus for performing the same method, and more particularly, a hybrid-based signal processing method for determining an audience rating of media from an audio signal of media by exploiting audio fingerprinting technology that searches for information based on a unique feature represented by the audio signal of the media and technology that inserts additional information related to media.

2. Description of Related Art

The media industry has undergone fast horizontal evolution to content-platform-network-device (C-P-N-D) based on smart phones and smart TVs. Accordingly, digital media is being served in various types such as real-time broadcasting, video on demand (VoD), or Internet streaming based on various networks (broadcasting network/mobile communication network/the Internet). In addition, with the proliferation of new media consumption devices that replace TVs such as PCs and smart phones, viewers may use desired media anytime and anywhere.

As a result, the media consumption behavior of viewers is expanding from fixed-TV-based real-time viewing to real-time and non-real-time viewing through various media devices such as PCs/smart phones.

Conventionally, in conducting a media audience measurement, panel households are formed based on basic research, and a separate device called People Meter is installed on a fixed TV of each panel household to measure how many people are viewing a broadcast channel or program. This measurement considers only fixed-TV-based real-time media viewing. Thus, it is impossible to investigate VoD viewing, and real-time and non-real-time viewing through PCs/smart phones.

Recently, an interest in audience measurement for PCs/smart phones using audio fingerprinting technology in view of media viewing types is growing. Here, the audio fingerprinting technology generates a database of fingerprints obtained through audio signal processing in advance, without distorting signals. In addition, the audio fingerprinting technology may determine an audience rating by detecting media currently being viewed through a comparison search with an audio fingerprint of the media being reproduced in a PC/smart phone based on the database.

However, although there may be a slight difference in a length of a silence section depending on a type of media (drama, music show, or talk show), silence sections in which a sound is absent appear frequently in most media. In this example, it is impossible to extract a fingerprint from a silence section in which a signal component is absent. Thus, the audio fingerprinting technology may not identify media being viewed. This adversely affects the accuracy and reliability of result of media audience measurement using audio fingerprints.

In order to solve such a problem, the present invention suggests a hybrid-based method of determining an audience rating of media that may identify media being viewed with respect to an audio silence section without degrading a sound quality of the original media.

SUMMARY

An aspect provides a signal processing method for determining an audience rating of media that may apply a hybrid form of acoustic data transmission technology or audio watermark technology that inserts additional information into an audio signal to overcome a technical performance limit that may occur in a silence section of media when media audio fingerprinting technology is solely used and applied to an application field of media audience measurement.

Another aspect also provides a hybrid-based media audience rating determining method that may be utilized in various fields such as fixed TV (radio)/mobile device (smart phone/smart pad)/PC-based integrated audience measurement, hardware (HW)-based People Meter substitution, and automatic content recognition (ACR)-based interworking services.

According to an aspect, there is provided a signal processing method for determining an audience rating of media, the signal processing method performed by an additional information inserting apparatus, the signal processing method including identifying a whole section of an audio signal of media as a non-silence section and a silence section, extracting a fingerprint of the media from a sound present in the non-silence section to specify the media, when a section of the audio signal is identified as the non-silence section, and inserting additional information related to the media into the silence section through a noise signal, when a section of the audio signal is identified as the silence section, wherein the additional information related to the media may be inserted into each of a plurality of silence sections in the whole section of the audio signal through the noise signal to determine an audience rating of the media with respect to the whole section of the audio signal.

The identifying may include identifying a section in which a sound is present in the whole section of the audio signal in a time domain as the non-silence section, and identifying a section in which a sound is absent as the silence section.

The non-silence section may be a section in which a feature of the audio signal of the media is maintained, and the silence section may be a section in which a feature of the audio signal of the media is absent.

The noise signal may be a signal of a preset level of frequency band that is inaudible to a viewer when the viewer views the media.

The fingerprint of the media may be information that specifies a sound present in the non-silence section before a viewer views the media to determine an audience rating with respect to the non-silence section in the whole section of the audio signal.

According to an aspect, there is provided a signal processing method for determining an audience rating of media, the signal processing method performed by a media reproducing apparatus, the signal processing method including reproducing media received from an additional information inserting apparatus, extracting at least one of a fingerprint of the media and additional information related to the media from each frame of an audio signal of the media to identify the media being reproduced, and determining one of the fingerprint of the media and the additional information related to the media extracted from the frame to be valid data to determine an audience rating of the media, wherein the additional information related to the media may be inserted into each of a plurality of silence sections in a whole section of the audio signal through a noise signal to determine an audience rating of the media with respect to the whole section of the audio signal.

The determining may include determining a first fingerprint of the media to be the valid data to determine the audience rating of the media, when the first fingerprint of the media is extracted from a sound present in the frame, and determining the additional information related to the media inserted into the noise signal to be the valid data to determine the audience rating of the media, when a second fingerprint of the media is extracted from the noise signal existing in the frame.

The valid data may include flag information to verify whether the fingerprint of the media is extracted from the frame or the additional information related to the media is extracted from the frame, and time information related to a reproducing time of the media corresponding to the frame from which the fingerprint of the media or the additional information related to the media is extracted.

The determining may further include ignoring the second fingerprint of the media when the second fingerprint of the media is extracted from the noise signal.

The fingerprint of the media may be information to identify the media from a sound present in a non-silence section in which a feature of the audio signal is present in the whole section of the audio signal, after the media is reproduced.

The signal processing method may further include transmitting the fingerprint of the media or the additional information related to the media determined to be the valid data to an audience rating determining apparatus.

According to an aspect, there is provided a signal processing method for determining an audience rating of media, the signal processing method performed by an audience rating determining apparatus, the signal processing method including receiving valid data determined for each frame of an audio signal of media from a media reproducing apparatus, identifying a fingerprint of the media or additional information related to the media by analyzing the valid data, determining an audience rating of the media using a fingerprint extracted by an additional information inserting apparatus, when the valid data is identified as the fingerprint of the media, and determining the audience rating of the media from the additional information related to the media, when the valid data is identified as the additional information related to the media, wherein an audience rating with respect to a whole section of the audio signal may be determined based on the fingerprint of the media extracted from a non-silence section of the audio signal and the additional information extracted from a silence section of the audio signal.

The valid data may include flag information having a value of "0" or "1" to identify the fingerprint of the media or the additional information related to the media received as the valid data, time information related to a reproducing time of the fingerprint of the media or the additional information related to the media in the non-silence section or the silence section of the audio signal, and the fingerprint of the media or the additional information related to the media corresponding to the flag information.

The identifying may include identifying the valid data as one of the fingerprint of the media or the additional information related to the media based on the flag information.

The fingerprint of the media may be information to identify the media from a sound present in the non-silence section in which a feature of the audio signal is present in the whole section of the audio signal of the media.

The additional information related to the media may be information inserted into a noise signal to represent a feature of the media in the silence section in which a feature of the audio signal is absent in the whole section of the audio signal of the media.

The determining of the audience rating of the media using the fingerprint may include comparing the identified fingerprint of the media to the fingerprint extracted and stored through the additional information inserting apparatus, and determining an audience rating of the media being viewed by a viewer from the identified fingerprint of the media, when the identified fingerprint of the media and the fingerprint extracted through the additional information inserting apparatus match.

According to an aspect, there is provided an additional information inserting apparatus including a section identifier configured to identify a whole section of an audio signal of media as a non-silence section and a silence section, a fingerprint extractor configured to extract a fingerprint of the media from a sound present in the non-silence section to specify the media, when a section of the audio signal is identified as the non-silence section, and an additional information inserter configured to insert additional information related to the media into the silence section through a noise signal, when a section of the audio signal is identified as the silence section, wherein the additional information related to the media may be inserted into each of a plurality of silence sections in the whole section through the noise signal to determine an audience rating of the media with respect to the whole section of the audio signal.

According to an aspect, there is provided a media reproducing apparatus including a media reproducer configured to reproduce media received from an additional information inserting apparatus, an information extractor configured to extract at least one of a fingerprint of the media and additional information related to the media from each frame of an audio signal of the media to identify the media being reproduced, and a valid data determiner configured to determine one of the fingerprint of the media and the additional information related to the media extracted from the frame to be valid data to determine an audience rating of the media, wherein the additional information related to the media may be inserted into each of a plurality of silence sections in a whole section of the audio signal through a noise signal to determine an audience rating of the media with respect to the whole section of the audio signal.

According to an aspect, there is provided an audience rating determining apparatus including a valid data receiver configured to receive valid data determined for each frame of an audio signal of media from a media reproducing apparatus, an information identifier configured to identify a fingerprint of the media or additional information related to the media by analyzing the valid data, a first audience rating determiner configured to determine an audience rating of the media using a fingerprint extracted by an additional information inserting apparatus, when the valid data is identified as the fingerprint of the media, and a second audience rating determiner configured to determine the audience rating of the media from the additional information related to the media, when the valid data is identified as the additional information related to the media, wherein an audience rating with respect to a whole section of the audio signal may be determined based on the fingerprint of the media extracted from a non-silence section of the audio signal and the additional information extracted from a silence section of the audio signal.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 8 is a flowchart illustrating a signal processing method performed by a media reproducing apparatus to determine an audience rating of media according to an example embodiment; and FIG. 9 is a flowchart illustrating a signal processing method performed by an audience rating determining apparatus to determine an audience rating of media according to an example embodiment.

DETAILED DESCRIPTION

Figure 1:
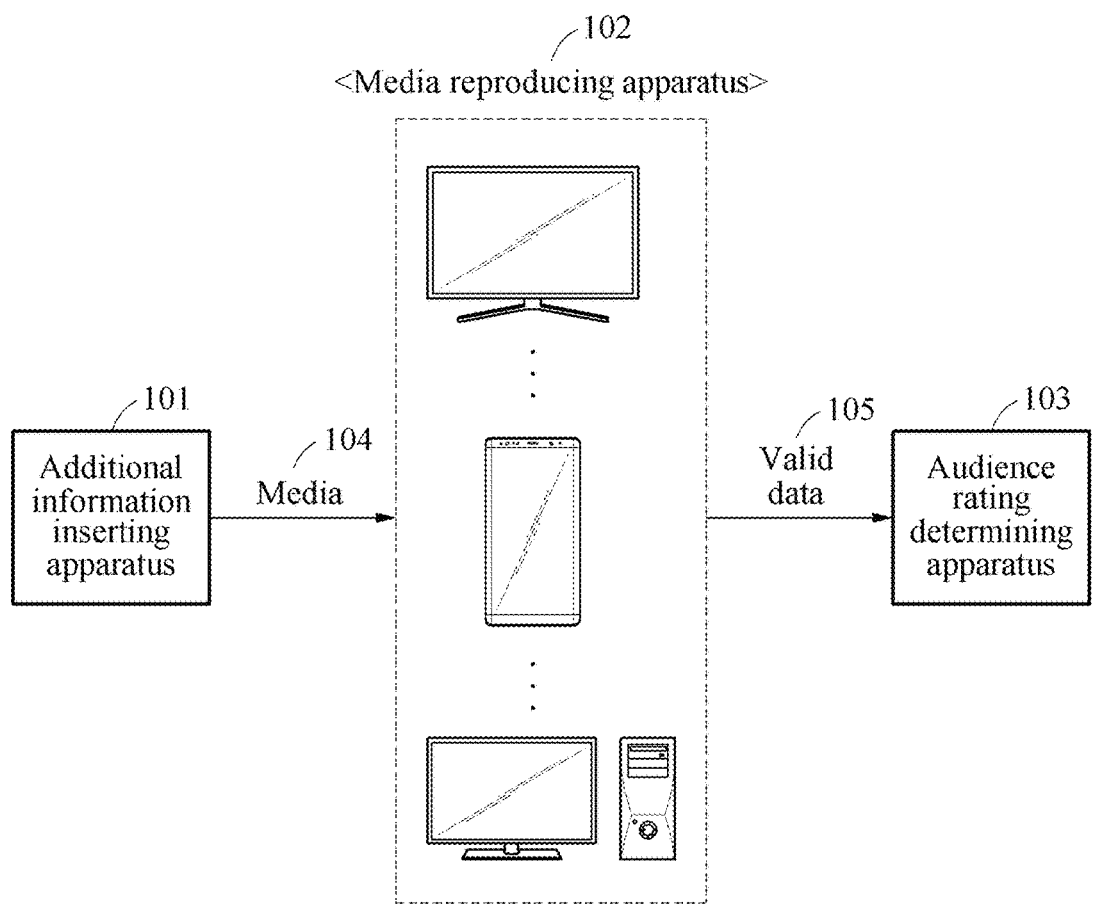
FIG. 1 illustrates an overall system for determining an audience rating of media according to an example embodiment.

Hereinafter, reference will now be made in detail to examples with reference to the accompanying drawings, wherein like reference numerals refer to like elements throughout. Various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms including technical and scientific terms used herein have the same meaning as commonly understood by one of ordinary skill in the art to which examples belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

When describing the examples with reference to the accompanying drawings, like reference numerals refer to like constituent elements and a repeated description related thereto will be omitted. When it is determined detailed description related to a related known function or configuration they may make the purpose of the examples unnecessarily ambiguous in describing the examples, the detailed description will be omitted here.

FIG. 1 illustrates an overall system for determining an audience rating of media according to an example embodiment.

Referring to FIG. 1, an additional information inserting apparatus 101 may receive media including a drama, a music show or a talk show, and identify a whole section of an audio signal of the media as a non-silence section and a silence section.

The additional information inserting apparatus 101 may extract a fingerprint of the media from a sound present in the non-silence section to specify the media, when a section of the audio signal is identified as the non-silence section. The additional information inserting apparatus 101 may insert additional information related to the media into the silence section through a noise signal, when a section of the audio signal is identified as the silence section. Here, the noise signal may be a signal of a preset level of frequency band that is inaudible to a viewer when the viewer views the media.

The additional information inserting apparatus 101 may generate the media in which the additional information related to the media is inserted into each of a plurality of silence sections in the whole section of the audio signal through the noise signal to determine an audience rating of the media with respect to the whole section of the audio signal. That is, the additional information inserting apparatus 101 may insert the additional information through the noise signal by forcibly distorting the silence section of the audio signal. The additional information inserting apparatus 101 may not apply a distortion of the audio signal such as additional information insertion to the non-silence section, thereby maintaining an audio quality of the original media as is.

For example, the additional information inserting apparatus 101 may be an apparatus used at a broadcasting station or a personal broadcasting station that distributes media through a broadcasting network, a mobile communication network, or the Internet.

A media reproducing apparatus 102 may reproduce the media received from the additional information inserting apparatus 101. In this example, the media reproducing apparatus 102 may reproduce the media received from the additional information inserting apparatus 101 through the broadcasting network, the mobile communication network, or the Internet. The media reproducing apparatus 102 may be an apparatus that reproduces media, for example, a TV, a radio, a smart device, or a PC.

The media reproducing apparatus 102 may extract at least one of a fingerprint of the media and additional information related to the media from each frame of the audio signal of the media to identify the media being reproduced. The media reproducing apparatus 102 may determine one of the fingerprint of the media and the additional information related to the media extracted from the frame to be valid data to determine an audience rating of the media. In detail, the media reproducing apparatus 102 may determine the additional information related to the media inserted into the noise signal to be the valid data to determine the audience rating of the media, when a second fingerprint of the media is extracted from the noise signal existing in the frame.

The media reproducing apparatus 102 may determine a first fingerprint of the media to be the valid data to determine the audience rating of the media, when the first fingerprint of the media is extracted from a sound present in the frame.

An audience rating determining apparatus 103 may receive the valid data determined for each frame of the audio signal of the media from the media reproducing apparatus 102. The audience rating determining apparatus 103 may identify the valid data as a fingerprint of the media or additional information related to the media. The audience rating determining apparatus 103 may determine an audience rating of the media using a fingerprint extracted and stored through the additional information inserting apparatus 101, when the valid data is identified as the fingerprint of the media. The audience rating determining apparatus 103 may determine the audience rating of the media from the additional information related to the media, when the valid data is identified as the additional information related to the media.

In brief, the present invention may stably perform a media audience measurement with respect to a whole section of an audio signal of media by inserting additional information related to content, for example, a content ID, using acoustic data transmission technology or audio watermark technology with respect to a silence section of the audio signal of the media through an additional information inserting apparatus and transferring the same to a media reproducing apparatus.

Figure 2:
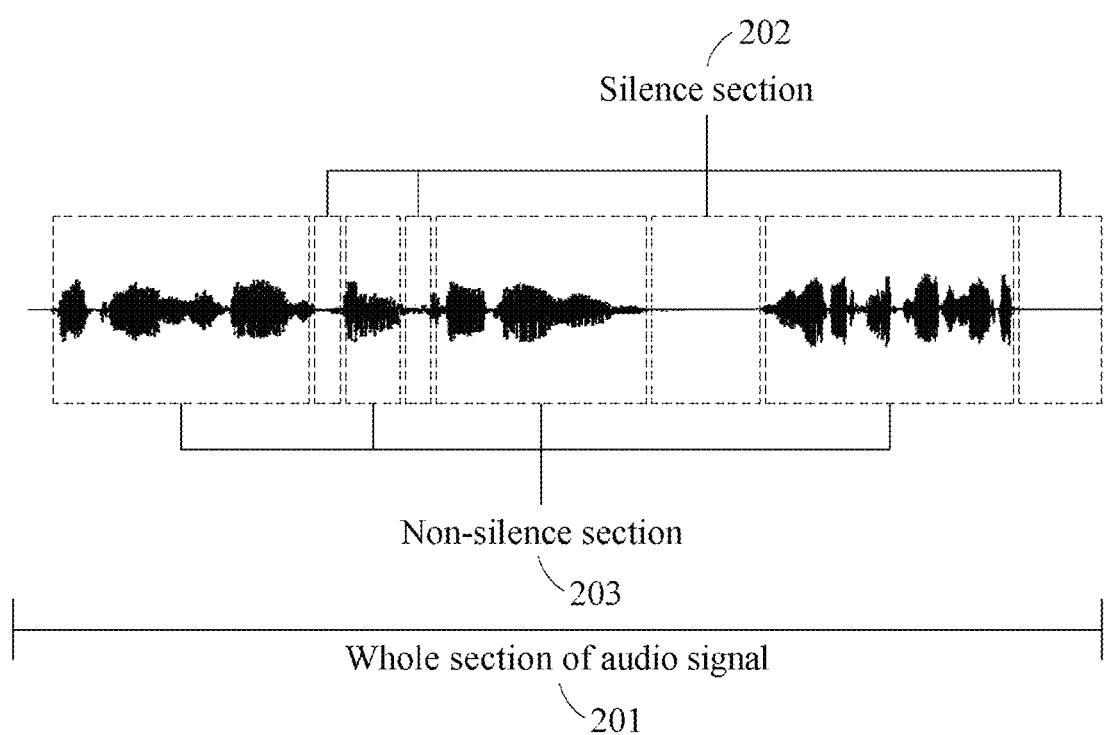
FIG. 2 illustrates a configuration of an audio signal of media according to an example embodiment.

FIG. 2 illustrates a configuration of an audio signal of media according to an example embodiment.

Referring to FIG. 2, an audio signal of media may include a non-silence section 203 and a silence section 202 corresponding to a whole section 201 of the audio signal.

In detail, the media may include image information and an audio signal synchronized with the image information. For example, the media may be information including image information and an audio signal of a TV drama, a documentary, or an entertainment show. In addition, when viewed from a time axis, the audio signal of the media may include the non-silence section 203 in which a sound is present and the silence section 202 in which a sound is absent. The silence section 202 may be a section in which a feature of the audio signal of the media is absent, and may appear for a few seconds or as long as about 10 seconds.

The present invention may determine an audience rating of media using audio fingerprinting technology that searches for media currently being reproduced by a media reproducing apparatus based on a unique feature of an audio signal of the media. That is, the audio fingerprinting technology may generate a fingerprint that identifies the media from a sound present in the non-silence section 203 in the whole section 201 of the media. The audio fingerprinting technology may use the generated fingerprint to detect what content of the media currently being reproduced is.

However, the audio fingerprinting technology may not generate a fingerprint that identifies the media currently being reproduced, in a silence section in which a sound is absent. That is, the silence section may not include a unique feature that specifies the corresponding media from the audio signal of the media, and thus there is a technical limit to generating a fingerprint.

Thus, the present invention suggests a method of stably determining an audience rating of the media with respect to the whole section 201 of the audio signal by inserting additional information related to the media into the silence section 202 of the audio signal through a noise signal.

Figure 3:
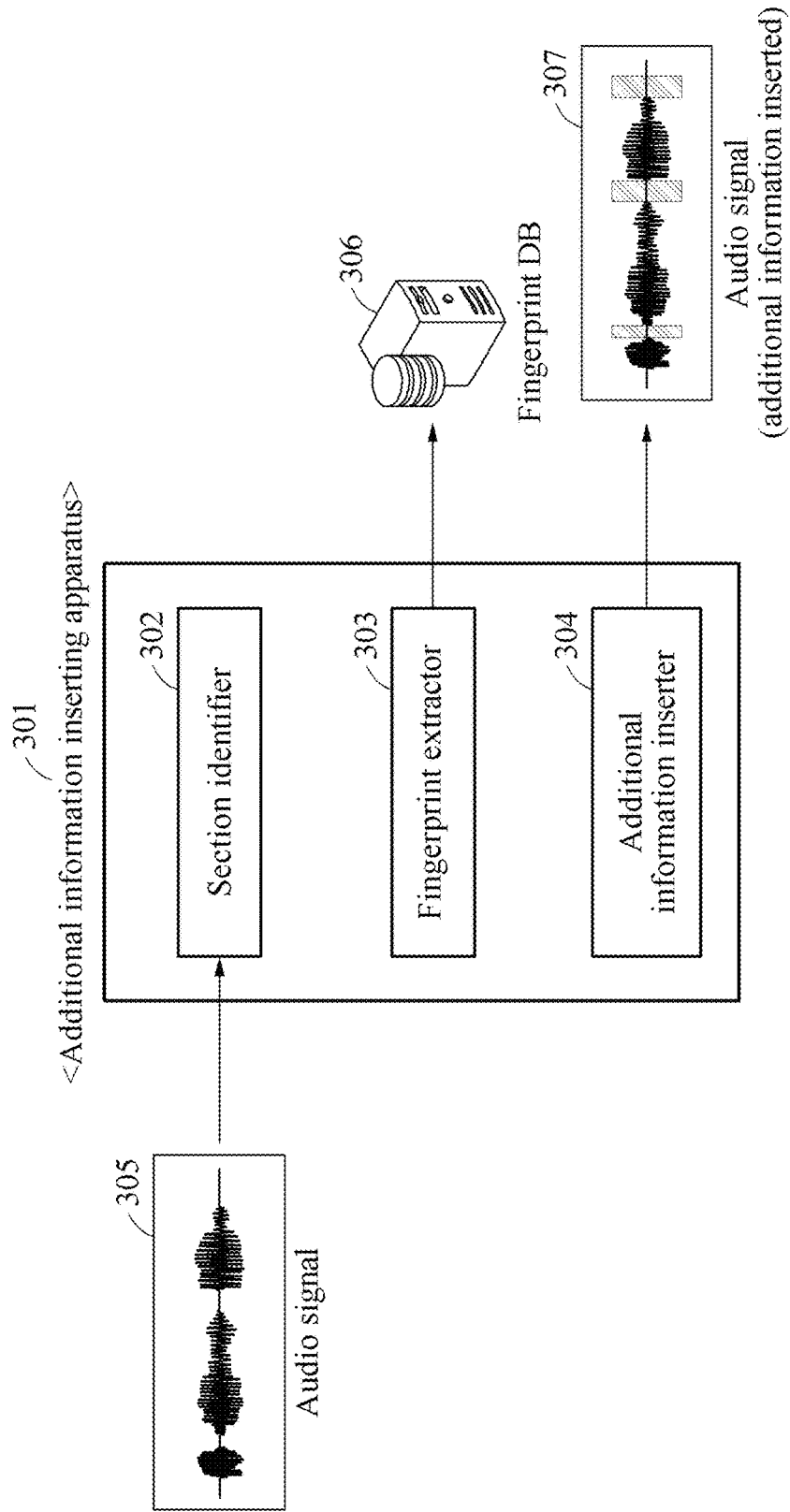
FIG. 3 illustrates a configuration of an additional information inserting apparatus according to an example embodiment.

FIG. 3 illustrates a configuration of an additional information inserting apparatus according to an example embodiment.

Referring to FIG. 3, an additional information inserting apparatus 301 may include a section identifier 302, a fingerprint extractor 303, and an additional information inserter 304.

An audio signal 305 may be input into the section identifier 302. The section identifier 302 may identify a whole section of an audio signal of media as a non-silence section and a silence section. In detail, the section identifier 302 may classify a section in which a sound is present in the whole section of the audio signal in a time domain as the non-silence section. The non-silence section may be a section in which a feature of the audio signal of the media is maintained.

The section identifier 302 may identify a section in which a sound is absent in the whole section of the audio signal in the time domain as the silence section. The silence section may be a section in which a feature of the audio signal of the media is absent.

The fingerprint extractor 303 may extract a fingerprint of the media from a sound present in the non-silence section to specify the media, when a section of the audio signal is identified as the non-silence section. In this example, the extracted fingerprint of the media may be information that specifies a sound present in the non-silence section before a viewer views the media to determine an audience rating with respect to the non-silence section in the whole section of the audio signal.

The fingerprint extractor 303 may match the extracted fingerprint of the media and identification information related to the media, and store a matching result in a fingerprint database (DB) interlinked with the additional information inserting apparatus 301. For example, the identification information related to the media may be a content ID that specifies the media. Fingerprints stored in the fingerprint DB may be compared to a fingerprint identified by a media reproducing apparatus reproducing the media, and utilized as comparison data to investigate media currently being viewed by the viewer based on a comparison result.

The additional information inserter 304 may insert additional information related to the media into a silence section not including a feature of the audio signal of the media through a noise signal. Here, the noise signal may be a signal of a preset level of frequency band that is inaudible to the viewer when the viewer views the media.

Thus, the additional information inserting apparatus 301 may generate an audio signal 307 in which additional information is inserted into a silence section of the audio signal 307 through a noise signal.

The additional information inserting apparatus 301 may insert the additional information into the silence section of the audio signal of the media through the noise signal, and utilize the additional information without deformation in a non-silence section from which a fingerprint is extracted. That is, the present invention may suggest a hybrid-based signal processing method for determining an audience rating of media that may generate a fingerprint in a non-silence section in a whole section of an audio signal of the media, and insert a noise signal into a silence section, thereby determining an audience rating of the media in the whole section of the audio signal.

Figure 4:
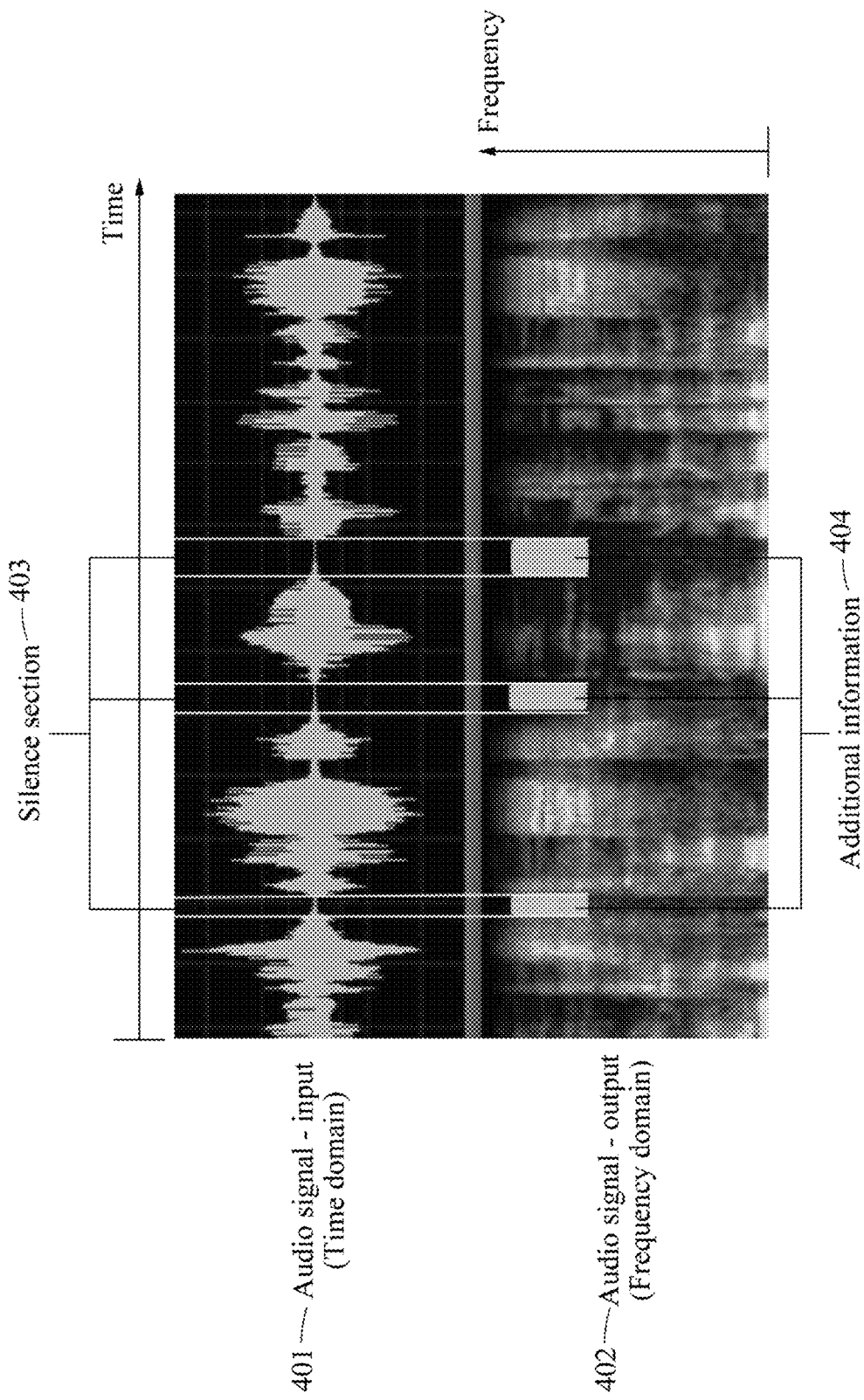
FIG. 4 illustrates audio signals in a time domain and a frequency domain according to an example embodiment.

FIG. 4 illustrates audio signals in a time domain and a frequency domain according to an example embodiment.

Referring to an upper portion of FIG. 4, a graph showing an audio signal 401 of media in a time domain is illustrated. The graph verifies that an audio signal of media is divided into non-silence sections and silence sections 403. An additional information inserting apparatus may insert additional information 404 related to the media into the silence sections 403 of the audio signal through a noise signal.

For example, the additional information inserting apparatus may insert the additional information 404 related to the media into the silence sections 403 of the audio signal through the noise signal based on acoustic data transmission technology or audio watermark technology.

Here, the additional information inserting apparatus may use a noise signal to insert the additional information 404 into the silence sections 403, the noise signal having a preset level of frequency band that is inaudible to a viewer when the viewer views the media. That is, the additional information inserting apparatus may insert the additional information 404 through the noise signal based on a graph of a lower portion of FIG. 4. The lower portion of FIG. 4 is a graph showing an audio signal 402 in a frequency domain. A noise signal of a low level in a band higher than an audible frequency band, for example, 10 kilohertz (kHz) or higher, may be added to silence sections. In this example, the additional information inserting apparatus may insert additional information related to media into the noise signal.

The additional information inserting apparatus may add the noise signal of the low level in a frequency band that is inaudible to a human ear to the silence sections 403 of the audio signal. Since a viewer may not perceive noise generated by the additional information 404 inserted into the audio signal of the media, the viewer may view the media without inconvenience.

Figure 5:
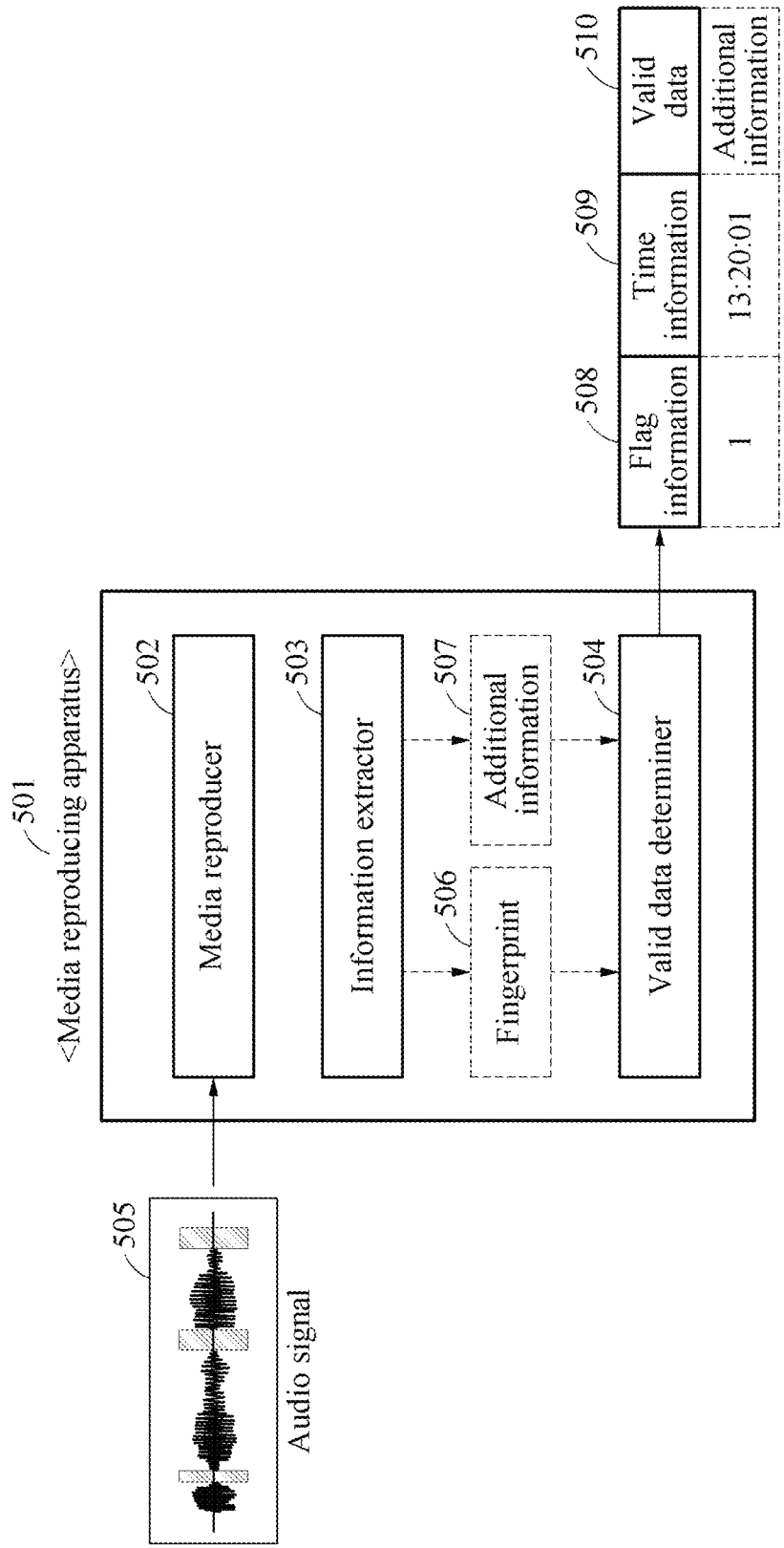
FIG. 5 illustrates a configuration of a media reproducing apparatus according to an example embodiment.

FIG. 5 illustrates a configuration of a media reproducing apparatus according to an example embodiment.

Referring to FIG. 5, a media reproducing apparatus 501 may include a media reproducer 502, an information extractor 503, and a valid data determiner 504.

The media reproducer 502 may reproduce media received from an additional information inserting apparatus. Here, the media may be media into which additional information is inserted by the additional information inserting apparatus through a noise signal, and the media reproducer 502 may reproduce the media into which the additional information is inserted. For example, the media reproducer 502 may be embodied in a TV or radio, a smart device, or a PC to receive an audio signal of the media from the additional information inserting apparatus through a broadcasting network, a mobile communication network, or the Internet. The media reproducer 502 may reproduce the received media. Further, the media reproducer 502 may receive an audio signal of a speaker interlinked with a separate device that reproduces media, as an audio signal of an input signal, depending on a situation.

The information extractor 503 may extract at least one of a fingerprint of the media and additional information related to the media from each frame of the audio signal of the media to identify the media being reproduced.

In detail, the information extractor 503 may extract different fingerprints of the media from a non-silence section and a silence section appearing in a whole section of the audio signal. The media may include the audio signal synchronized with actual image information and the noise signal inserted by the additional information inserting apparatus. The information extractor 503 may extract a first fingerprint 506 of the media from the signal synchronized with the image information or extract a second fingerprint 506 from the noise signal inserted by the additional information inserting apparatus. In this example, the information extractor 503 may extract the second fingerprint 506 of the media from the noise signal inserted into the audio signal of the media, and further extract additional information 507 inserted into the noise signal.

Thus, the first fingerprint 506 of the media to identify the media may be extracted from a sound synchronized with the actual image information in the non-silence section of the audio signal. Further, the second fingerprint 506 of the media and the additional information 507 included in the noise signal may be extracted from the noise signal inserted by a noise signal inserting apparatus in the silence section of the audio signal.

If information related to the identified audio silence section is transferred to a media reproducing terminal processing module through a separate data channel or an audio-based data insertion in the example of FIG. 2, selective extraction of only one of a fingerprint or additional information from each signal frame may be sufficient, unlike the processing method of FIG. 4.

Thus, the information extractor 503 may extract the first fingerprint 506 of the media from the non-silence section of the audio signal and simultaneously extract the second fingerprint 506 of the media and the additional information 507 related to the media from the silence section, in extracting a fingerprint of the media from each frame of a predetermined time section of the audio signal.

The valid data determiner 504 may determine one of the fingerprint of the media and the additional information related to the media extracted from the frame to be valid data to determine an audience rating of the media. For this, the valid data determiner 504 may investigate a validity of the fingerprint of the media or the additional information related to the media extracted from each frame of the time section of the audio signal.

That is, when a second fingerprint of the media is extracted from the noise signal existing in the frame, the valid data determiner 504 may determine the additional information related to the media inserted into the noise signal to be the valid data to determine the audience rating of the media. In this example, the valid data determiner 504 may ignore the second fingerprint of the media extracted from the noise signal, and determine the additional information related to the media to be the valid data. In this example, the ignored second fingerprint of the media may correspond to invalid data.

When a first fingerprint of the media is extracted from a sound present in the frame, the valid data determiner 504 may determine the extracted first fingerprint of the media to be the valid data to determine the audience rating of the media.

The valid data to be transmitted to an audience rating determining apparatus may have a structure including flag information 508 indicating a type of the valid data, time information 509, and information 510 determined to be the valid data. Here, the flag information 508 may be information to distinguish whether the fingerprint of the media is extracted from the frame or the additional information related to the media is extracted from the frame, and whether the determined valid data is the fingerprint of the media or the additional information related to the media inserted into the audio signal may be indicated through a "flag" field of a head. The time information 509 may indicate a reproducing time of the media corresponding to the frame from which the fingerprint of the media or the additional information related to the media is extracted. The information 510 determined to be valid data may include one of the fingerprint of the media and the additional information related to the media.

For example, the valid data determiner 504 may determine valid data including the flag information 508 of "1" and the time information 509 of "13:20:01" for the additional information related to the media which is the information 510 determined to be the valid data.

Then, the media reproducing apparatus 501 may transmit the fingerprint of the media or the additional information related to the media determined to be the valid data to the audience rating determining apparatus.

Further, when assuming a viewer changes media currently being viewed, for example, changes a channel of a TV or changes Internet streaming content, using a user interface (UI) provided by the media reproducing apparatus, an audio signal of new media may not be input into the media reproducing apparatus and thus, a fingerprint of the media or additional information related to the media may not be extracted. In this example, the media reproducing apparatus may not transmit a frame of the new media to the audience rating determining apparatus, thereby preventing reflection of an audience measurement with respect to the corresponding frame in advance.

Figure 6:
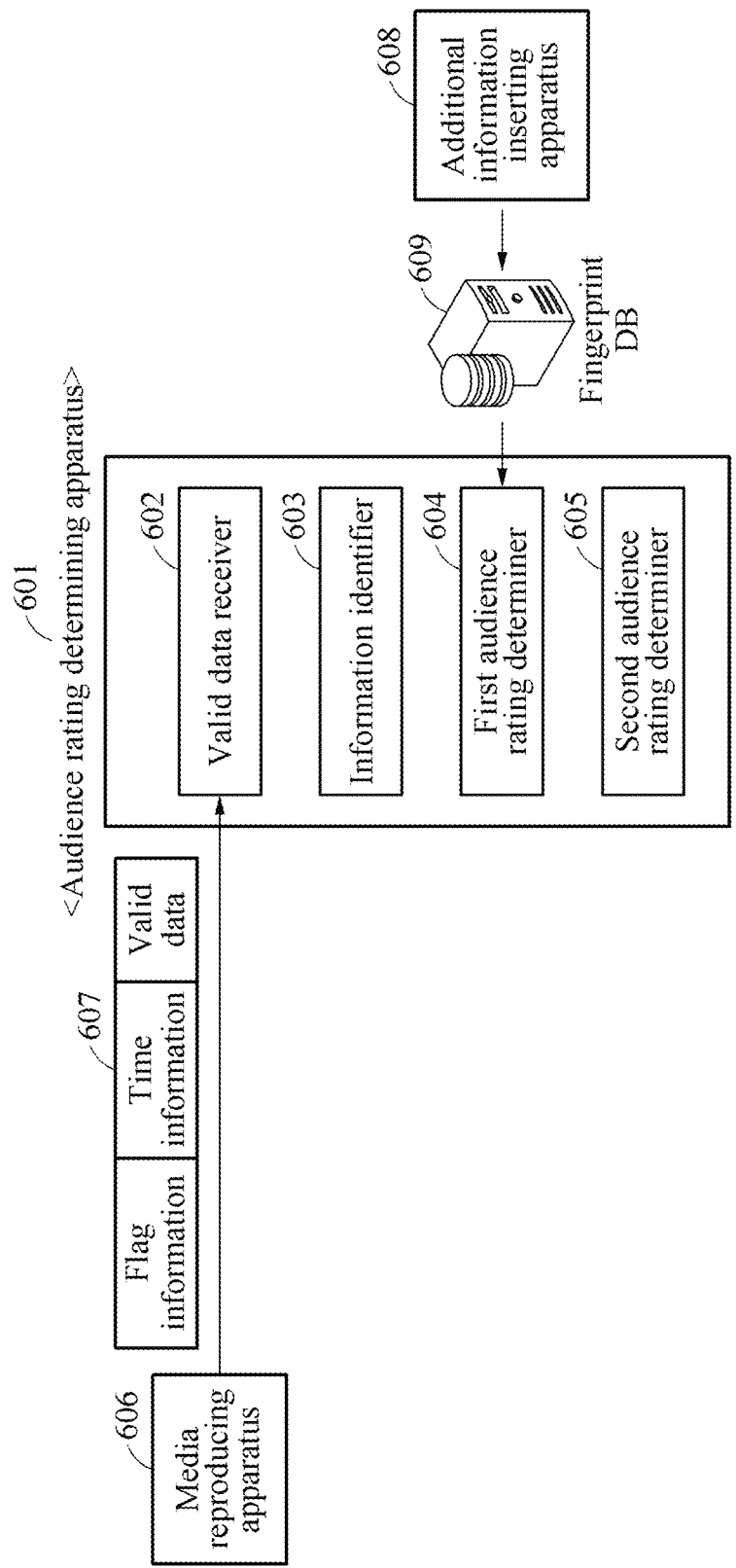
FIG. 6 illustrates a configuration of an audience rating determining apparatus according to an example embodiment.

FIG. 6 illustrates a configuration of an audience rating determining apparatus according to an example embodiment.

Referring to FIG. 6, an audience rating determining apparatus 601 may include a valid data receiver 602, an information identifier 603, a first audience rating determiner 604, and a second audience rating determiner 605.

The valid data receiver 602 may receive valid data 607 determined for each frame of an audio signal of media from a media reproducing apparatus 606.

The information identifier 603 may identify the valid data 607 as a fingerprint of the media or additional information related to the media. In detail, the information identifier 603 may identify the valid data as the fingerprint of the media or the additional information related to the media based on flag information included in the valid data. For example, the information identifier 603 may identify the valid data as the fingerprint of the media if the flag information included in the valid data is "0". The information identifier 603 may identify the valid data as the additional information related to the media if the flag information included in the valid data is "1".

When the valid data is identified as the fingerprint of the media, the first audience rating determiner 604 may determine an audience rating of the media using the fingerprint extracted by an additional information inserting apparatus 608. In detail, the first audience rating determiner 604 may compare the identified fingerprint of the media to a fingerprint stored in a fingerprint DB 609 through the additional information inserting apparatus 608.

When the identified fingerprint of the media and a fingerprint extracted through the additional information inserting apparatus 608 match, the first audience rating determiner 604 may determine an audience rating of the media being viewed by a viewer from the identified fingerprint of the media.

For example, if the flag information is "0", the first audience rating determiner 604 may identify a content ID through a comparison search with the fingerprint DB 609 based on a fingerprint extracted from a sound present in a non-silence section of the audio signal.

When the valid data is identified as the additional information related to the media, the second audience rating determiner 605 may determine the audience rating of the media from the additional information related to the media.

For example, if the flag information is "1", the second audience rating determiner 605 may extract content ID information by extracting the additional information related to the media added to a noise signal inserted into a silence section of the audio signal.

In this example, when time information of the media reproducing apparatus 606 included in the valid data is determined to be inaccurate, the audience rating determining apparatus 601 may delete the received time information. When valid data is received from the media reproducing apparatus 606, the audience rating determining apparatus 601 may update time information included in the valid data in view of a network delay time in a reception time.

The audience rating determining apparatus 601 may use the content ID information and the time information to determine the audience rating through the first audience rating determiner 604 and the second audience rating determiner 605, thereby obtaining a superhigh-reliability result of audience measurement without decreasing an audio quality of the original media.

Figure 7:
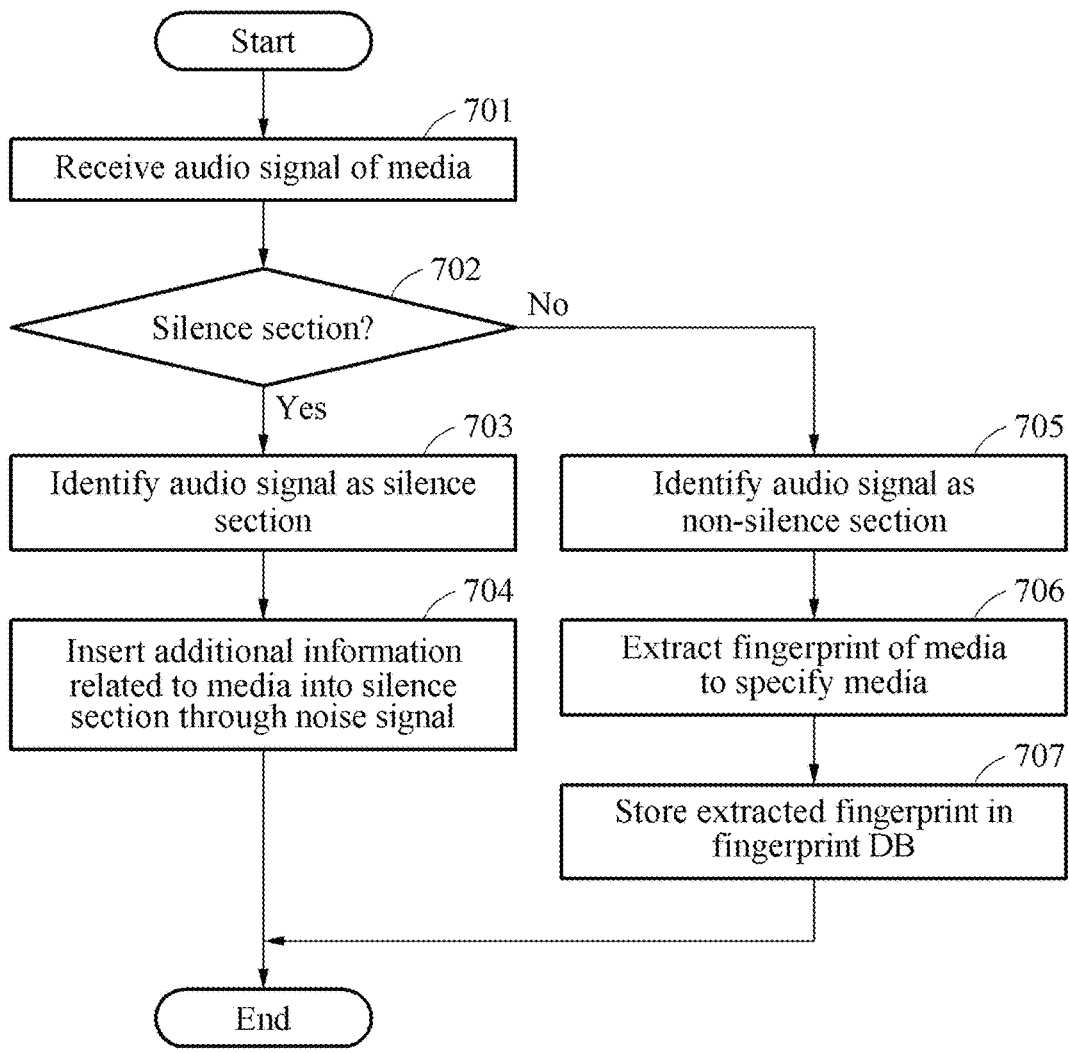
FIG. 7 is a flowchart illustrating a signal processing method performed by an additional information inserting apparatus to determine an audience rating of media according to an example embodiment.

FIG. 7 is a flowchart illustrating a signal processing method performed by an additional information inserting apparatus to determine an audience rating of media according to an example embodiment.

Referring to FIG. 7, in operation 701, an additional information inserting apparatus may receive an audio signal of media. The additional information inserting apparatus may identify a whole section of the audio signal of the media as a non-silence section and a silence section.

In detail, the audio signal of the media may include the non-silence section and the silence section in a time domain. The additional information inserting apparatus may identify a section in which a sound is present in the whole section of the audio signal as the non-silence section, and identify a section in which a sound is absent as the silence section. Here, the non-silence section may be a section in which a feature of the audio signal of the media is maintained, and the silence section may be a section in which a feature of the audio signal of the media is absent.

In operation 702, the additional information inserting apparatus may determine whether a predetermined time section of the audio signal corresponds to the silence section. In detail, the additional information inserting apparatus may determine whether the predetermined time section of the audio signal corresponds to the silence section for each frame of the predetermined time section of the audio signal of the media.

In a case in which the predetermined time section of the audio signal corresponds to the silence section (operation 702: Yes), the additional information inserting apparatus may identify the predetermined time section of the audio signal as the silence section, in operation 703.

In operation 704, the additional information inserting apparatus may insert additional information related to the media into the silence section to specify the media in the silence section not including the feature of the audio signal of the media. That is, the additional information inserting apparatus may insert the additional information related to the media into the silence section through a noise signal. Here, the noise signal may be a signal of a preset level of frequency band that is inaudible to a viewer when the viewer views the media.

In a case in which the predetermined time section of the audio signal does not correspond to the silence section (operation 702: No), the additional information inserting apparatus may identify the predetermined time section of the audio signal as the non-silence section, in operation 705.

In operation 706, the additional information inserting apparatus may extract a fingerprint of the media from a sound present in the non-silence section to specify the media. That is, the additional information inserting apparatus may extract the fingerprint as information that specifies the sound present in the non-silence section, before the viewer views the media to determine an audience rating with respect to the non-silence section in the whole section of the audio signal.

In operation 707, the additional information inserting apparatus may store the extracted fingerprint in a fingerprint DB. The fingerprint stored in the fingerprint DB may be utilized by an audience rating determining apparatus as comparison data to determine the audience rating of the media for valid data determined by a media reproducing apparatus.

Through the above process, the additional information inserting apparatus may generate media in which additional information related to the media is inserted into each of a plurality of silence sections in a whole section of an audio signal through a noise signal to determine an audience rating of the media with respect to the whole section of the audio signal. Further, the additional information inserting apparatus may transmit, to a media reproducing apparatus, the media to which technology related to the fingerprint of the media is applied and in which the additional information related to the media is inserted, at a request from a user who wants to view the media.

FIG. 8 is a flowchart illustrating a signal processing method performed by a media reproducing apparatus to determine an audience rating of media according to an example embodiment.

Referring to FIG. 8, in operation 801, a media reproducing apparatus may receive media generated by an additional information inserting apparatus. Here, the media may be media in which additional information related to the media is inserted into a silence section in a whole section of an audio signal of the media to determine an audience rating of the media with respect to the whole section of the audio signal. The media reproducing apparatus may reproduce the media received from the additional information inserting apparatus.

In operation 802, the media reproducing apparatus may extract at least one of a fingerprint of the media and additional information related to the media from each frame of the audio signal of the media to identify the media being reproduced. Here, the fingerprint of the media may be information to identify the media from a sound present in a non-silence section in the whole section of the audio signal, after the media is reproduced.

The media reproducing apparatus may extract the fingerprint of the media being reproduced by the media reproducing apparatus from a sound included in each frame of a predetermined time section in the whole section of the audio signal. Here, different fingerprints of the media may be extracted from the non-silence section and the silence section appearing in the whole section of the audio signal.

In operation 803, the media reproducing apparatus may verify whether the additional information related to the media is extracted, in extracting at least one of the fingerprint of the media and the additional information related to the media from each frame of the audio signal.

In a case in which the additional information related to the media is extracted (operation 803: Yes), the media reproducing apparatus may determine additional information inserted into a noise signal to be valid data to determine an audience rating of the media, in operation 804. That is, the media reproducing apparatus may extract the fingerprint of the media from a sound present in each frame of a predetermined time section with respect to the whole section of the audio signal of the media. In this example, the media reproduced by the media reproducing apparatus may include a noise signal inserted into the non-silence section by the additional information inserting apparatus. The media reproducing apparatus may extract the fingerprint of the media with respect to the whole section of the media currently being reproduced.

However, since the noise signal is added to the silence section of the audio signal only to insert the additional information related to the media, a second fingerprint of the media extracted from the noise signal inserted at random into the silence section of the audio signal may not include a feature that specifies the media.

That is, the second fingerprint of the media extracted from the noise signal may represent a unique feature of the noise signal modulated at random by the additional information inserting apparatus. However, the extracted second fingerprint of the media may not represent a unique feature of the audio signal of the media currently being reproduced.

Thus, the second fingerprint of the media extracted from the noise signal inserted into the silence section of the audio signal may correspond to invalid data to determine the audience rating of the media, and the additional information included in the noise signal may correspond to valid data to determine the audience rating of the media.

Accordingly, when the second fingerprint of the media is extracted from the noise signal, the media reproducing apparatus may ignore the second fingerprint of the media extracted from the noise signal, and determine the additional information inserted into the noise signal to be the valid data to determine the audience rating of the media.

In a case in which the additional information related to the media is not extracted (operation 803: No), the media reproducing apparatus may determine a first fingerprint of the media to be the valid data to determine the audience rating of the media, in operation 805. The valid data may include flag information to verify whether the first fingerprint of the media is extracted from the frame or the additional information related to the media is extracted from the frame, and time information related to a reproducing time of the media corresponding to the frame from which the first fingerprint of the media or the additional information related to the media is extracted.

In operation 806, the media reproducing apparatus may transmit the first fingerprint of the media or the additional information related to the media determined to be the valid data to an audience rating determining apparatus.

FIG. 9 is a flowchart illustrating a signal processing method performed by an audience rating determining apparatus to determine an audience rating of media according to an example embodiment.

Referring to FIG. 9, in operation 901, an audience rating determining apparatus may receive valid data to determine an audience rating of media from a media reproducing apparatus. The valid data may be a fingerprint of the media or additional information related to the media determined for each frame of an audio signal of the media. The valid data may further include flag information and time information.

In operation 902, the audience rating determining apparatus may verify the flag information included in the valid data. That is, the audience rating determining apparatus may verify the flag information included in the valid data to verify whether the valid data received from the media reproducing apparatus is the fingerprint of the media or the additional information related to the media.

In operation 903, the audience rating determining apparatus may verify whether the flag information included in the valid data is "0".

If the flag information is "0" (operation 903: Yes), the audience rating determining apparatus may identify the valid data received from the media reproducing apparatus as the fingerprint of the media, in operation 904. That is, if a value indicated by the flag information included in the valid data is "0", the audience rating determining apparatus may identify information of a predetermined time section of the frame determined to be the value data by the media reproducing apparatus as the fingerprint of the media.

In operation 905, the audience rating determining apparatus may compare the fingerprint of the media to a fingerprint extracted and stored by an additional information inserting apparatus. Here, the fingerprint of the media may be information to identify the media from a sound present in a non-silence section in which a feature of the audio signal is present in a whole section of the audio signal of the media. The audience rating determining apparatus may compare the fingerprint of the media to the fingerprint extracted and stored by the additional information inserting apparatus to verify a program or an image corresponding to the media being reproduced by the media reproducing apparatus.

In operation 906, the audience rating determining apparatus may determine an audience rating of the media being viewed by a viewer from the identified fingerprint of the media, when the identified fingerprint of the media and the fingerprint extracted by the additional information inserting apparatus match. In this example, the audience rating determining apparatus may determine the audience rating of the media being viewed by the viewer based on the time information included in the valid data. That is, the audience rating determining apparatus may specify the media being reproduced by the media reproducing apparatus among a plurality of media being broadcast at the same time from the fingerprint of the media based on the time information included in the valid data. That is, the audience rating determining apparatus may identify a content ID of the media being reproduced from the fingerprint of the media, and determine the audience rating of the media based on the identified content ID.

If the flag information is not "0" (operation 903: No), the audience rating determining apparatus may identify the valid data received from the media reproducing apparatus as the additional information related to the media, in operation 907. That is, if the value indicated by the flag information included in the valid data is not "0", the audience rating determining apparatus may identify the information of the predetermined time section of the frame determined to be the value data by the media reproducing apparatus as the additional information related to the media.

In operation 908, the audience rating determining apparatus may determine the audience rating of the media being reproduced by the media reproducing apparatus among the plurality of media being broadcast at the same time from the additional information related to the media based on the time information included in the valid data. The audience rating determining apparatus may identify a content ID of the media being reproduced from the additional information related to the media, and determine the audience rating of the media based on the identified content ID.

In brief, the audience rating determining apparatus may identify a finger print of media or additional information related to the media by analyzing valid data determined for each frame of an audio signal of the media. Further, the audience rating determining apparatus may determine an audience rating of the media from the identified fingerprint of the media or the identified additional information related to the media.

According to an example embodiment, a signal processing method for determining an audience rating of media may apply a hybrid form of acoustic data transmission technology or audio watermark technology that inserts additional information into an audio signal to overcome a technical performance limit that may occur in a silence section of media when media audio fingerprinting technology is solely used and applied to an application field of media audience measurement.

According to an example embodiment, a signal processing method for determining an audience rating of media may be utilized in various fields such as fixed TV (radio)/mobile device (smart phone/smart pad)/PC-based integrated audience measurement, hardware (HW)-based People Meter substitution, and automatic content recognition (ACR)-based interworking services.

The components described in the exemplary embodiments of the present invention may be achieved by hardware components including at least one Digital Signal Processor (DSP), a processor, a controller, an Application Specific Integrated Circuit (ASIC), a programmable logic element such as a Field Programmable Gate Array (FPGA), other electronic devices, and combinations thereof. At least some of the functions or the processes described in the exemplary embodiments of the present invention may be achieved by software, and the software may be recorded on a recording medium. The components, the functions, and the processes described in the exemplary embodiments of the present invention may be achieved by a combination of hardware and software.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for enabling an audience rating of media to be determined, performed by an additional information inserting apparatus, the method comprising:
   identifying a non-silence section and a silence section within a continuous section of an audio signal of the media;
   extracting a fingerprint of the media from a sound present in the identified non-silence section; and
   inserting additional information into the identified silence section via a noise signal,
   wherein the fingerprint and the inserted additional information continuously identify the media to enable an audience rating determining apparatus to determine the audience rating of the media.

2. The signal processing method of claim 1, wherein the identifying comprises:
   identifying the non-silence section as a section in which the sound is present within the continuous section of the audio signal in a time domain; and
   identifying the silence section as a section in which sound is absent within the continuous section.

3. The signal processing method of claim 1, wherein
   the non-silence section is a section in which a feature of the audio signal of the media is maintained, and
   the silence section is a section in which the feature of the audio signal of the media is absent.

4. The signal processing method of claim 1, wherein the noise signal occurs at a frequency band that is inaudible to a human.

5. The signal processing method of claim 1, wherein the fingerprint includes information that specifies a sound present in the non-silence section before a viewer views the media, and is used to determine an audience rating with respect to the non-silence section within the continuous section of the audio signal.

6. The signal processing method of claim 1, wherein the additional information identifies the media, and the fingerprint identifies the media.

7. A method for enabling an audience rating of media to be determined, performed by a media reproducing apparatus, the method comprising:
   reproducing the media that is received from an additional information inserting apparatus;
   extracting either one or both of a fingerprint of the media and additional information related to the media from each frame of an audio signal of the media;
   determining one of the fingerprint and the additional information to be valid data; and
   transmitting the valid data to an audience rating determining apparatus,
   wherein the additional information is located in a plurality of silence sections within a continuous section of the audio signal as a noise signal, and
   wherein the fingerprint and the inserted additional information continuously identify the media to enable the audience rating determining apparatus to determine the audience rating of the media.

8. The signal processing method of claim 7, wherein the determining comprises:
   determining a first fingerprint of the media to be the valid data, in response to the first fingerprint of the media being extracted from a sound present in the audio signal; and
   determining the additional information to be the valid data, in response to a second fingerprint of the media being extracted from the noise signal that exists in the audio signal.

9. The signal processing method of claim 8, wherein the determining further comprises ignoring the second fingerprint when the second fingerprint is extracted from the noise signal.

10. The signal processing method of claim 7, wherein the valid data includes:
    flag information to verify whether the fingerprint of the media is extracted from the audio signal or the additional information is extracted from the audio signal, and
    time information related to a reproduction time of the media corresponding to the frame from which the fingerprint or the additional information is extracted.

11. The signal processing method of claim 7, wherein the fingerprint includes information used to identify the media from a sound present in a non-silence section in which a feature of the audio signal is present in the continuous section of the audio signal, after the media is reproduced.

12. The signal processing method of claim 7, wherein the transmitting of the valid data comprises:
  transmitting the additional information to the audience rating determining apparatus, in response to the additional information being determined to be the valid data.

13. The signal processing method of claim 7, wherein the additional information identifies the media, and the fingerprint identifies the media.

14. A method for determining an audience rating of media, performed by an audience rating determining apparatus, the method comprising:
  receiving valid data determined for each frame of an audio signal of the media from a media reproducing apparatus;
  determining which one of a fingerprint of the media and additional information related to the media is the valid data;
  determining the audience rating of the media based on the valid data,
  wherein the fingerprint is extracted from a non-silence section of the audio signal, and the additional information is extracted from a silence section of the audio signal, and
  wherein the additional information identifies the media, and the fingerprint identifies the media.

15. The signal processing method of claim 14, wherein the valid data includes:
  flag information having a value of "0" or "1" to identify the fingerprint or the additional information as the valid data; and
  time information related to a reproduction time of the fingerprint or the additional information.

16. The signal processing method of claim 15, wherein the identifying comprises identifying the valid data as one of the fingerprint and the additional information.

17. The signal processing method of claim 14, wherein the fingerprint includes information to identify the media from a sound present in the non-silence section in which a feature of the audio signal is present in the continuous section of the audio signal of the media.

18. The signal processing method of claim 14, wherein the additional information related to the media includes information inserted into a noise signal to represent a feature of the media in the silence section in which a feature of the audio signal is absent in the continuous section of the audio signal of the media.

19. The signal processing method of claim 14, wherein the determining of the audience rating of the media comprises:
  comparing the fingerprint to an additional fingerprint extracted and stored through an additional information inserting apparatus; and
  determining an audience rating of the media that is being viewed from the fingerprint, in response to detecting that the fingerprint and the additional fingerprint match.

* * * * *